United States Patent
Tomimatsu et al.

(10) Patent No.: US 7,524,573 B2
(45) Date of Patent: Apr. 28, 2009

(54) FUEL CELL HAVING INNER AND OUTER PERIPHERY SEAL MEMBERS

(75) Inventors: Norihiro Tomimatsu, Mitaka (JP);
Atsushi Sadamoto, Kawasaki (JP);
Yasuhiro Harada, Isehara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 721 days.

(21) Appl. No.: 11/062,811

(22) Filed: Feb. 23, 2005

(65) Prior Publication Data
US 2005/0249997 A1    Nov. 10, 2005

(30) Foreign Application Priority Data
Feb. 23, 2004    (JP) ............................. 2004-046748

(51) Int. Cl.
*H01M 2/00* (2006.01)
*H01M 2/02* (2006.01)
*H01M 2/08* (2006.01)

(52) U.S. Cl. ........................................ 429/35; 429/34
(58) Field of Classification Search ................... 429/34, 429/35
See application file for complete search history.

(56) References Cited

U.S. PATENT DOCUMENTS

| 6,261,711 | B1 * | 7/2001 | Matlock et al. | ............... 429/34 |
| 7,056,614 | B2 * | 6/2006 | Sugita et al. | .................. 429/35 |
| 7,201,987 | B2 * | 4/2007 | Sugita et al. | .................. 429/35 |

FOREIGN PATENT DOCUMENTS

| JP | 10-74530 | 3/1998 |
| JP | 2002-42834 | 2/2002 |

* cited by examiner

*Primary Examiner*—Patrick Ryan
*Assistant Examiner*—Julian Mercado
(74) *Attorney, Agent, or Firm*—Oblon, Spivak, McClelland, Maier & Neustadt, P.C.

(57) ABSTRACT

A fuel cell formed by arranging a plurality of unit cells, wherein each unit cell comprises a membrane electrode assembly arranged such that an electrolyte membrane is clamped between a membrane-like oxidizer electrode and a membrane-like fuel electrode as well as the electrolyte membrane is disposed with the outer periphery thereof protruding from the outer peripheries of the fuel electrode and the oxidizer electrode, a first separator disposed with an abutment surface abutting on the fuel electrode of the membrane electrode assembly and having a first flow path for supplying fuel, and a second separator disposed with an abutment surface abutting on the oxidizer electrode of the membrane electrode assembly and having a second flow path for supplying an oxidizer.

17 Claims, 2 Drawing Sheets

FUEL CELL HAVING INNER AND OUTER PERIPHERY SEAL MEMBERS

CROSS-REFERENCE TO RELATED APPLICATIONS

This application is based upon and claims the benefit of priority from prior Japanese Patent Application No. 2004-046748, filed Feb. 23, 2004, the entire contents of which are incorporated herein by reference.

BACKGROUND OF THE INVENTION

1. Field of the Invention

The present invention relates to a fuel cell using liquid fuel as fuel and used particularly in electronic equipment, and the like.

2. Description of the Related Art

Recently, various types of equipment such as OA equipment, audio equipment, and radio equipment are reduced in size due to development of a semiconductor technology, and it is further required to be provided with portability. To satisfy the requirement, a primary cell, a secondary cell, and the like, which are available easily, are used. However, the operating time of the primary and secondary cells is limited in their function, and thus the operating time of the OA equipment or the like using them is naturally limited.

When the primary cell is used, the OA equipment or the like can be operated by replacing the cell after the discharge thereof is finished. However, since the operating time of the primary cell is short with respect to its weight, it is not suitable for portable equipment. Further, although the secondary cell can be recharged after the discharge thereof is finished, the cell is disadvantageous in that not only a place where it is used is limited because a power supply for recharging it is necessary, but also a considerable time is necessary to recharge it. In particular, in OA equipment or the like to which the secondary cell is assembled, the operating time of the equipment cannot help being limited because it is difficult to replace the cell even if the discharge thereof is finished. Since it is difficult to operate various small equipment by a prolongation of the conventional primary is and secondary cells as described above, there is required a cell suitable for a long time operation.

As means for solving the above problem, recently, attention is paid to a fuel cell. The fuel cell has an advantage in that not only it can generate power only by being supplied with fuel and an oxidizer but also it can continuously generate power by replacing only fuel. Accordingly, it can be said that the fuel cell is a system which is very advantageous to operate small equipment such as OA equipment whose power consumption is small if the size thereof can be reduced. In particular, a fuel cell, which uses hydro carbon liquid such as alcohol as fuel, can safely carry fuel having an high energy density, it is hopeful as a fuel cell for electronic equipment.

The fuel cell described above has the following problems. That is, when liquid fuel is used in a fuel cell for electronic equipment, the electronic equipment fails if the liquid fuel and moisture leak from the fuel cell. In particular, in a fuel cell such as a fuel cell for portable equipment, which operates at a relatively low temperature, an electrolyte membrane, which exhibits proton conductivity in a water containing state as electrolyte, is often used due to the high ion conductivity thereof. Further, in a fuel cell, an electrolyte membrane is sealed by being clamped between seal members to prevent fuel, which is generally an active substance, from being mixed with air or from leaking to the outside. However, in this state, the end surface of the electrolyte membrane is exposed to outside air, from which a problem arises in that water in the electrolyte membrane emits as moisture from the end surface and adversely affects the electronic equipment.

For example, in a fuel cell 100 shown in FIG. 5, a membrane electrode assembly 104 is formed by clamping an electrolyte membrane 103 between a fuel electrode 101 and an oxidizer electrode 102 with its outer periphery 103a exposed therefrom. A unit cell is formed by clamping the membrane electrode assembly 104 between two separators 105 and 106. In the fuel cell 100 arranged as described above, a leakage of liquid fuel and air to the outside is prevented by clamping seals between the separators 105 and 106 and the protruding portion 103a of the electrolyte membrane 103. However, since the protruding portion 103a of the electrolyte membrane 103 is exposed to outside air, water in the electrolyte membrane 103 leaks to the outside as moisture.

BRIEF SUMMARY OF THE INVENTION

Accordingly, an object of the present invention is to provide a fuel cell which is suitable as a power supply, and the like for electronic equipment and excellent in a long-term preserving property by preventing a leakage of liquid fuel, which adversely affects the electronic equipment, and emission thereof from an electrolyte membrane to the outside.

According to one aspect of the present invention, there is provided a fuel cell formed by arranging a plurality of unit cells, wherein each unit cell comprises: a membrane electrode assembly arranged such that an electrolyte membrane is clamped between an oxidizer electrode and a fuel electrode as well as the electrolyte membrane is disposed with the outer periphery thereof protruding from the outer peripheries of the fuel electrode and the oxidizer electrode; a first separator disposed with an abutment surface abutting on the fuel electrode of the membrane electrode assembly and having a first flow path for supplying fuel; a second separator disposed with an abutment surface abutting on the oxidizer electrode of the membrane electrode assembly and having a second flow path for supplying an oxidizer; a first inner periphery seal member formed to the portion of the abutment surface of the first separator facing the outer periphery of the electrolyte membrane and hermetically sealed by being abutted against the outer periphery of the electrolyte membrane in a compressed and deformed state; a second inner periphery seal member formed to the portion of the abutment surface of the second separator facing the outer periphery of the electrolyte membrane and hermetically sealed by being abutted against the outer periphery of the electrolyte membrane in a compressed and deformed state; a first outer periphery seal member formed to the portion of the abutment surface of the first separator facing the outer periphery of the electrolyte membrane on the abutment surface side of the second separator; and a second outer periphery seal member formed to the portion of the abutment surface of the second separator facing the first outer periphery seal member and hermetically sealed in a compressed and deformed state by being abutted against the first outer periphery seal member.

According to the present invention, there can be provided the fuel cell which is suitable as the power supply, and the like for electronic equipment and excellent in the long-term preserving property by preventing the leakage of the liquid fuel, which adversely affects the electronic equipment, and emission thereof from the electrolyte membrane to the outside.

DETAILED DESCRIPTION OF THE INVENTION

Figure 1:
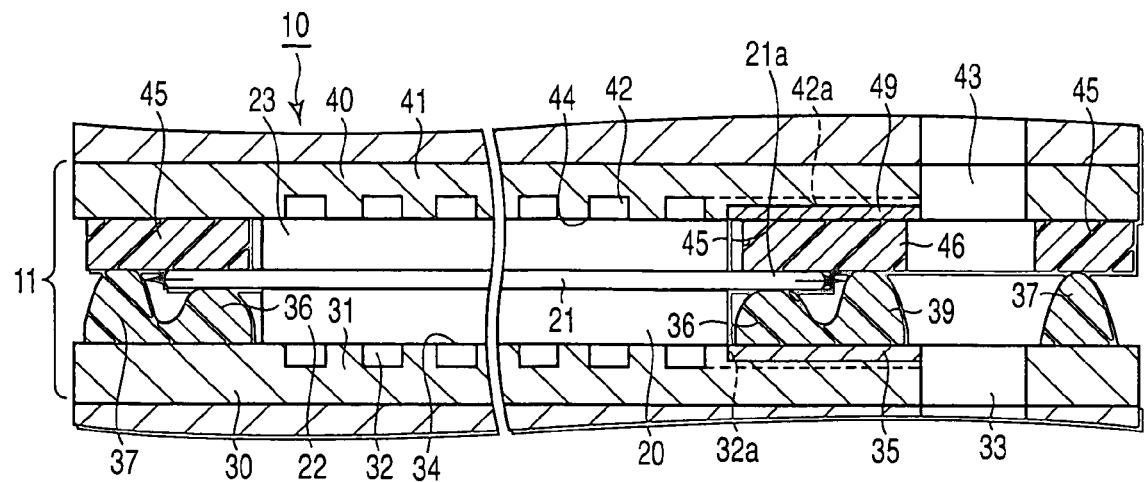
FIG. 1 is a longitudinal sectional view showing a unit cell assembled in a fuel cell according to an embodiment of the present invention.
Figure 2:
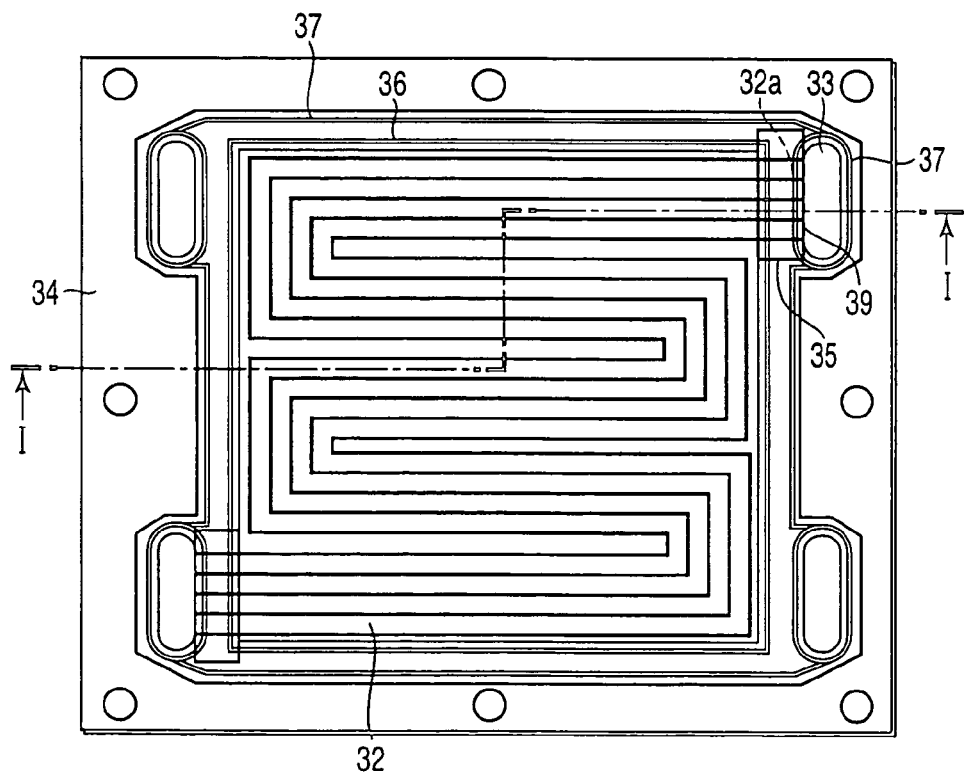
FIG. 2 is a plan view showing a first separator assembled in the unit cell.
Figure 3:
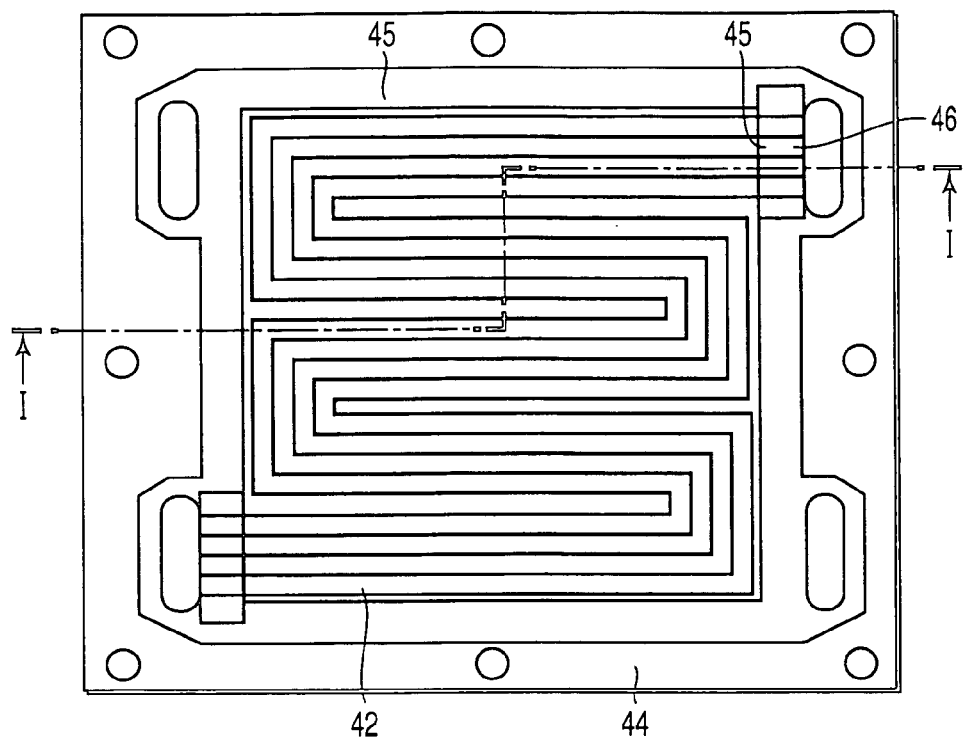
FIG. 3 is a plan view showing a second separator assembled in the unit cell.

FIG. 1 is a longitudinal sectional view schematically showing a main portion of a unit cell 11 assembled in a fuel cell 10 according to an embodiment of the present invention, FIG. 2 is a plan view showing a first separator 30 assembled in the unit cell 11, and FIG. 3 is a plan view showing a second separator 40 assembled in the unit cell 11. Note that FIG. 1 corresponds to a sectional view taken along the line X-X in FIGS. 2 and 3 and viewed in the direction of arrows.

The fuel cell 10 is mounted on electronic equipment such as, for example, a portable personal computer, and is arranged by stacking a multiplicity of the unit cells 11. The unit cell 11 includes a membrane electrode assembly 20, and the first separator 30 and the second separator 40 disposed to clamp the membrane electrode assembly 20 therebetween.

The membrane electrode assembly 20 includes an electrolyte membrane 21, and an oxidizer electrode 22 and a fuel electrode 23 clamping the electrolyte membrane 21 therebetween. The outer periphery 21a of the electrolyte membrane 21 protrudes outward from the outer peripheries of the oxidizer electrode 22 and the fuel electrode 23. The electrolyte membrane 21 has a property for exhibiting proton conductivity in a water containing state.

As shown in FIGS. 1 and 2, the first separator 30 includes a sheet-shaped separator main body 31 which has a flow path (first flow path) 32 opened on the upper surface of the separator main body 31 in FIG. 1 and internal manifold holes (first internal manifold hole) 33 which are formed to pass through the front and rear surfaces of the separator main body 31 and to which air and liquid fuel supply sources (not shown) are connected. The separator main body 31 is formed of, for example, carbon.

The internal manifold holes 33 are connected to the flow path 32 through a connection path 32a. An abutment surface 34, which is abutted against the fuel electrode 23, is formed on the upper surface of the separator main body 31 in FIG. 1, and a bridge plate 35 is disposed to the connection path 32a on the abutment surface 34 side thereof. The bridge plate 35 is formed of, for example, a titanium material. The titanium material is excellent is corrosion resistance and elutes less ions which deteriorate the performance of the fuel cell.

Further, the abutment surface 34 has a first inner periphery seal member 36 formed to the portion thereof facing the protruding portion of the electrolyte membrane of the membrane electrode assembly 20 in the periphery of the flow paths 32, and a first outer periphery seal member 37 is disposed to the outside of the first inner periphery seal member 36. A first internal manifold hole seal member 39, which surrounds the peripheries of the internal manifold holes 33, is formed continuously to the first outer periphery seal member 37 so as to be flush therewith. The ridgelines of the first inner periphery seal member 36 and the first internal manifold hole seal member 39 travel inside of the bridge plate 35, whereas the ridgeline of the first outer periphery seal member 37 travels outside of the bridge plate 35.

As shown in FIGS. 1 and 3, the second separator 40 includes a sheet-shaped separator main body 41 which has a flow path (second flow path) 42 opened on the lower surface thereof in FIG. 1 and an internal manifold hole (second internal manifold hole) 43 which is formed to pass through the front and rear surfaces of the separator main body 41 and to which air and liquid fuel supply sources (not shown) are connected. The separator main body 41 is formed of, for example, carbon.

The internal manifold hole 43 is connected to the flow path 42 through a connection path 42a. An abutment surface 44, which is abutted against the fuel electrode 23, is formed to the lower surface of the separator main body 41 in FIG. 1.

Further, the abutment surface 44 has a flat seal member (second inner periphery seal member and second outer periphery seal member) 45 disposed at a position facing the first inner periphery seal member 36 and the first outer periphery seal member 37. A second internal manifold hole seal member 46 is formed around the internal manifold hole 43.

The first inner periphery seal member 36, the first outer periphery seal member 37, the first internal manifold hole seal member 39, the flat seal member 45, and the second internal manifold hole seal member 46 described above are formed of, for example, rubber, and are more preferably formed of ethylene propylene rubber (EPDM) excellent in methanol resistance.

Further, the hardness of the rubber material is preferably 35° or more and 60° or less. When the hardness of the rubber material is less than 35°, compression set is increased, and thus there is a possibility that a leakage occurs in the seal members because the surface pressure of components is reduced as a time passes. Whereas, when the hardness of the rubber material is larger than 60°, a compressing pressure necessary to deform the components is increased and thus a compressing structure is increased in size. The hardness of the rubber material is more preferably 40° or more and 50° or less.

Further, the compression rate of the rubber material is preferably set to 20% or more and 50% or less. When the compression rate of the rubber material is less than 20%, there is a possibility that a leakage occurs from the seals because the surface pressure of the seals is partially reduced due to the dimensional accuracy of the components. Whereas, when the compression rate is larger than 50%, a compressing pressure is increased, and there is a possibility that the rubber material is broken due to deformation. The compression rate of the rubber material is more preferably 25% or more and 35% or less.

The fuel cell 10 arranged as described above generates power in the following manner. That is, liquid fuel and air are supplied from the supply source to the respective unit cell 11s through the internal manifold holes 33 and 43. The liquid fuel is introduced to the flow paths 32 of the first separator 30, the air is introduced to the flow path 42 of the second separator 40, and power is generated in the electrolyte membrane 21.

Even if the liquid fuel leaks from an end of the bridge plate 35 while power is generated, since no liquid fuel leaks to the outside of the ridgelines of the first outer periphery seal member 37 and the flat seal member 45 and to the outside of the ridge lines of the first internal manifold hole seal member 39 and the second seal member 46, the electronic equipment is not adversely affected by the liquid fuel.

Further, the outside of the electrolyte membrane 21 is kept in an airtight state by the first outer periphery seal member 37 and the flat seal member 45, it is possible to confine moisture in the cell. Accordingly, moisture can be prevented from leaking to the outside of the fuel cell and adversely affecting the electronic equipment while power is generated as well as the water content of the electrolyte membrane 21 can be kept to a predetermined level or more when power generation is stopped, thereby deterioration of the performance of the fuel cell such as an increase in an internal resistance because the electrolyte membrane 21 is dried, and the like can be prevented.

Note that, in the embodiment, since the electrolyte membrane 21 is clamped between the rubber seal members, a surface pressure necessary for long-term sealing can be secured by designing the compression rate of the rubber material equal to or less than the compression set of the rubber material.

When, for example, a double seal is provided as well as a component facing one inner periphery seal is composed of a porous electrode to improve the air tightness between the membrane electrode assembly and the separators, the porous electrode is crushed and deformed by the compressing pressure of a stack as a time passes because it has no elastic force. As a result, there is a possibility that the seal is broken because a surface pressure necessary for sealing cannot be secured.

Further, the embodiment has such a structure that the rubber seal members are caused to come into pressure contact with each other as in the first outer periphery seal member 37 and the flat seal member 45, and in the first internal manifold hole seal member 39 and the flat seal member 45. Accordingly, a large contact area can be secured by deforming the seal members on both the sides, and further the contact surfaces of the seal members are not displaced with respect to lateral vibration because the seal members are deformed themselves to follow the vibration. Accordingly, the sealing is not broken. In particular, when one seal member is formed in a flat shape, and the other seal member is formed in a rib shape, they are liable to follow the lateral vibration. Further, when one seal member is formed in a concave shape and the other seal member is formed in a convex shape so as to engage in the one seal member, occurrence of lateral displacement can be prevented, thereby possibility that sealing is broken is reduced.

In contrast, when a member which is abutted against one outer periphery seal member is the other separator, since only the seal member is compressed and deformed, the contact area of the seal surface is reduced. Accordingly, when this arrangement is used in portable equipment, there is a possibility that the separator is displaced from the seal member by vibration and the like, and sealing is broken. Further, when the separator is formed of metal, even if the separator is molded integrally with the seal members, the intimate contact property of the separator with the seal members is bad at the interface there-between because a metal surface is flat and smooth. Accordingly, there is a possibility that positional displacement occurs at the interface between the separator, and the inner periphery seal member, the outer periphery seal member, and the internal manifold hole seal member due to lateral vibration and the like, and sealing is broken.

Further, appropriate carbon separators whose surface roughness is within the range described later are used as the separator members 31 and 41, irregular portions are formed on the surfaces thereof. Therefore, when the seal members are molded integrally with the separators 31 and 41, rubber is engaged in the irregularities on the surfaces of the separators and increases the intimate contact strength between it and the separators, thereby sealing strength against vibration is increased. Note that the surface roughness Rz (10-point average roughness) is preferably 1 μm or more and 15 μm or less. That is, when the surface roughness is less than 1 μm, an intimate contact property is bad when the seal members are formed on the separator members 31 and 41 integrally therewith. Whereas, when the surface roughness is larger than 15 μm, a gap is formed between the seal members and the separator, and a leakage occurs in sealing. The surface roughness is more preferably 3 μm or more to 10 μm or less.

Further, danger that sealing is broken by positional displacement in lamination can be avoided by forming the first inner periphery seal member 36, the first outer periphery seal member 37, and the first internal manifold hole seal member 39 in a convex shape and forming the flat seal member 45 and the second seal member 46, which face the above seal members, in a flat shape. Furthermore, when a material having low rubber hardness is used in the seal members, it comes into intimate contact with the electrolyte membrane 21 on a flat surface. Accordingly, expansion and contraction of the electrolyte membrane 21 in a flat surface direction due to a change of water contained therein can be suppressed, thereby breakage of sealing can be prevented.

In addition, the first inner periphery seal member 36, the first outer periphery seal member 37, and the flat seal member 45 are molded integrally with each other. With this arrangement, the first inner periphery seal member 36, the first outer periphery seal member 37, and the flat seal member 45 are caused to integrally come into contact with each other by the separators, thereby the seal members are unlike to be displaced even if stress is applied to the stacked surfaces of the stack in a parallel direction or even if excessive pressure is applied to fluids flowing in the flow paths 32 and 42.

Figure 5:
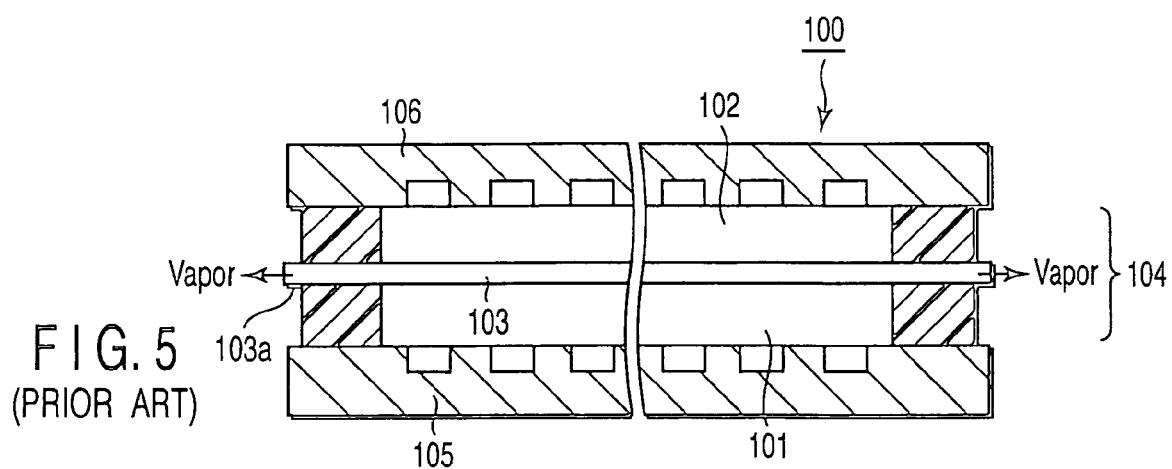
FIG. 5 is a longitudinal sectional view showing an example of a unit cell assembled in a conventional fuel cell.

The fuel cell 10 according to the embodiment will be compared with the fuel cell 100 shown in FIG. 5. A stack was constructed by stacking 20 unit cells 11 each having an electrode area of 5 cm×5 cm in a seal structure provided with outer periphery seals. EPDM having hardness of 40° was used as a seal material. The fuel cells 10 and 100 were supplied with a 2M methanol water solution and air as a fuel and generated power at a stack temperature of 80° C. for 10 hours, and moisture leaking to outside air was condensed and collected.

As a result, in the fuel cell 10 provided with the first and second outer periphery seal members, no moisture leaked to the outside air was collected in power generation executed for 10 hours. However, in the fuel cell 100 provided with no outer periphery seal member, about 6 g of moisture was collected. It can be found from the fact described above that no liquid fuel and moisture leak to the outside of the fuel cell 10 by employing the seal shape of the present invention.

Figure 4:
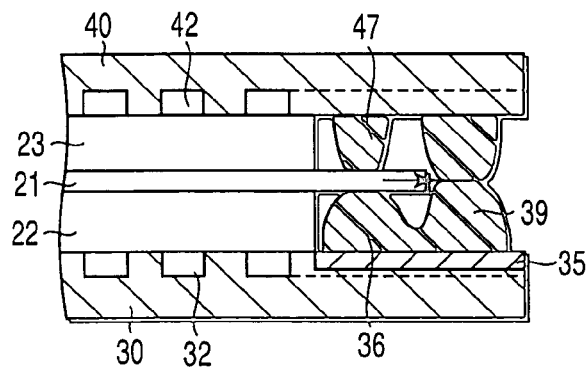
FIG. 4 is a sectional view showing a main portion of a modification of the unit cell.

FIG. 4 is a sectional view showing a main portion of a modification of the unit cell 11 described above. Note that the same functional components as those shown in FIG. 1 are denoted by the same reference numerals in FIG. 4, and the detailed description thereof is omitted. The flat seal member 45 described above is composed of the second inner periphery seal member integrally molded with the second outer periphery seal member. In the modification, however, an inner periphery seal member 47 and an outer periphery seal member 48 are molded independently of each other. The same effect can be obtained even if the above arrangement is employed.

It should be noted that the present invention is by no means limited to the above embodiment as it is and can be embodied by modifying the components of the embodiment within a range which does not depart from the gist of the present invention. Further, various inventions can be made by appropriately combining the plurality of components disclosed in the embodiment. For example, some components may be omitted from all the components disclosed in the embodiment. Further, components in different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell formed by arranging a plurality of unit cells, wherein each unit cell comprises:
    a membrane electrode assembly including an electrolyte membrane disposed between a membrane-like oxidizer electrode and a membrane-like fuel electrode, the electrolyte membrane having an outer periphery protruding from outer peripheries of the fuel electrode and the oxidizer electrode;
    a first separator having an abutment surface abutting on the fuel electrode of the membrane electrode assembly and having a first flow path for supplying fuel;
    a second separator having an abutment surface abutting on the oxidizer electrode of the membrane electrode assembly and having a second flow path for supplying an oxidizer;
    a first inner periphery seal member formed to a portion of the abutment surface of the first separator facing the outer periphery of the electrolyte membrane and hermetically sealed by being abutted against the outer periphery of the electrolyte membrane in a compressed and deformed state;
    a second inner periphery seal member formed to a portion of the abutment surface of the second separator facing the outer periphery of the electrolyte membrane and hermetically sealed by being abutted against the outer periphery of the electrolyte membrane in a compressed and deformed state;
    a first outer periphery seal member formed to the portion of the abutment surface of the first separator facing the outer periphery of the electrolyte membrane on the abutment surface side of the second separator; and
    a second outer periphery seal member formed to the portion of the abutment surface of the second separator facing the first outer periphery seal member and hermetically sealed in a compressed and deformed state by being abutted against the first outer periphery seal member.

2. A fuel cell according to claim 1, wherein the first inner periphery seal member is molded integrally with the first outer periphery seal member.

3. A fuel cell according to claim 1, wherein the second inner periphery seal member is molded integrally with the second outer periphery seal member.

4. A fuel cell according to claim 1, wherein any one of the first inner periphery seal member and the second inner periphery seal member is formed in a convex shape and the other thereof is formed in a flat shape.

5. A fuel cell according to claim 1, wherein any one of the first outer periphery seal member and the second outer periphery seal member is formed in a convex shape and the other thereof is formed in a flat shape.

6. A fuel cell according to claim 1, wherein
    a first internal manifold hole which communicates with the first flow path and is formed through front and rear surfaces of the first separator,
    a second internal manifold hole which communicates with the second flow path and is formed through front and rear surfaces of the second separator,
    the first outer periphery seal member surrounds the first internal manifold hole by being provided with a portion disposed outside of the first internal manifold hole and with a first internal manifold hole seal member disposed inside of the first internal manifold hole and having a ridgeline flush with the portion disposed outside of the first internal manifold hole, and
    the second outer periphery seal member surrounds the second internal manifold hole by being provided with a portion disposed outside of the second internal manifold hole and with a second internal manifold hole seal member disposed inside of the second communication to face the first internal manifold hole seal member and having a ridgeline flush with the portion disposed outside of the second internal manifold hole.

7. A fuel cell according to claim 1, wherein
    the first and second separators have peripheral edges provided with internal manifold holes so as to pass through the separators in the thickness direction thereof as well as to communicate with the flow paths, and
    the first separator has a bridge plate disposed so as to be approximately flush with an abutment surface on a communication path with the internal manifold hole of the flow path, the fuel cell comprising:
    a first internal manifold hole seal member formed to a portion of the abutment surface of the first separator facing the outer periphery of the electrolyte membrane structure and formed on the abutment surface side of the second separator; and a second internal manifold hole seal member formed to a portion of the abutment surface of the second separator facing the first internal manifold hole seal member, the second internal manifold hole seal member being compressed and deformed by being abutted against the first internal manifold hole seal member so that they are hermetically sealed to each other,
    the first inner periphery seal member and the first internal manifold hole seal member having ridgelines formed to travel on the bridge plate, and the ridgelines of the first outer periphery seal member traveling outside of the bridge plate.

8. A fuel cell according to claim 7, wherein the second separator has a bridge plate disposed so as to be approximately flush with an abutment surface on a communication path with the internal manifold hole of the flow path.

9. A fuel cell according to claim 7, wherein the bridge plate is formed of titanium.

10. A fuel cell according to claim 1, wherein at least one of the first inner periphery seal member, the second inner periphery seal member, the first outer periphery seal member, and the second outer periphery seal member is formed of rubber having a hardness of 35° or more and 60° or less.

11. A fuel cell according to claim 1, wherein at least one of the first inner periphery seal member, the second inner periphery seal member, the first outer periphery seal member, and the second outer periphery seal member is formed of rubber having a hardness of 40° or more and 50° or less.

12. A fuel cell according to claim 1, wherein at least one of the first and second inner periphery seal members and the first and second outer periphery seal members comprises a rubber seal having a compression rate 20% or more and 50% or less in a stack.

13. A fuel cell according to claim 1, wherein at least one of the first and second inner periphery seal members and the first and second outer periphery seal members comprises a rubber seal having a compression rate 25% or more and 35% or less in a stack.

14. A fuel cell according to claim 1, wherein at least one of the first inner periphery seal member, the second inner periphery seal member, the first outer periphery seal member, and the second outer periphery seal member is formed of ethylene propylene rubber.

15. A fuel cell according to claim 1, wherein at least one of the first and second separators is formed of carbon.

16. A fuel cell according to claim 15, wherein the 10-point average surface roughness of the surface of the separator formed of carbon is 1 μm or more and 15 μm or less.

17. A fuel cell according to claim 15, wherein the 10-point average surface roughness of the surface of the separator formed of carbon is 3 μm or more and 10 μm or less.

* * * * *